No. 770,392. Patented September 20, 1904.

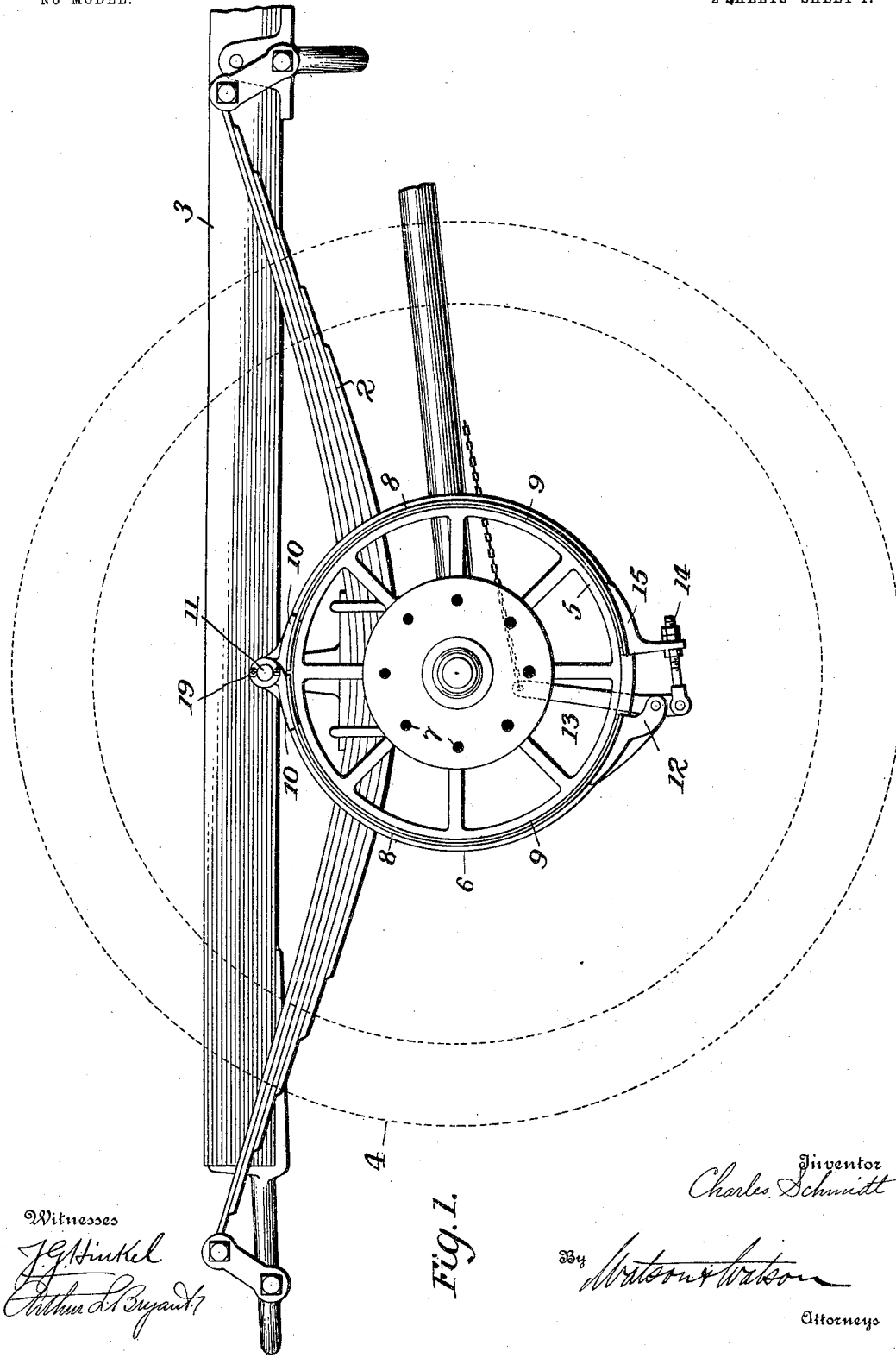

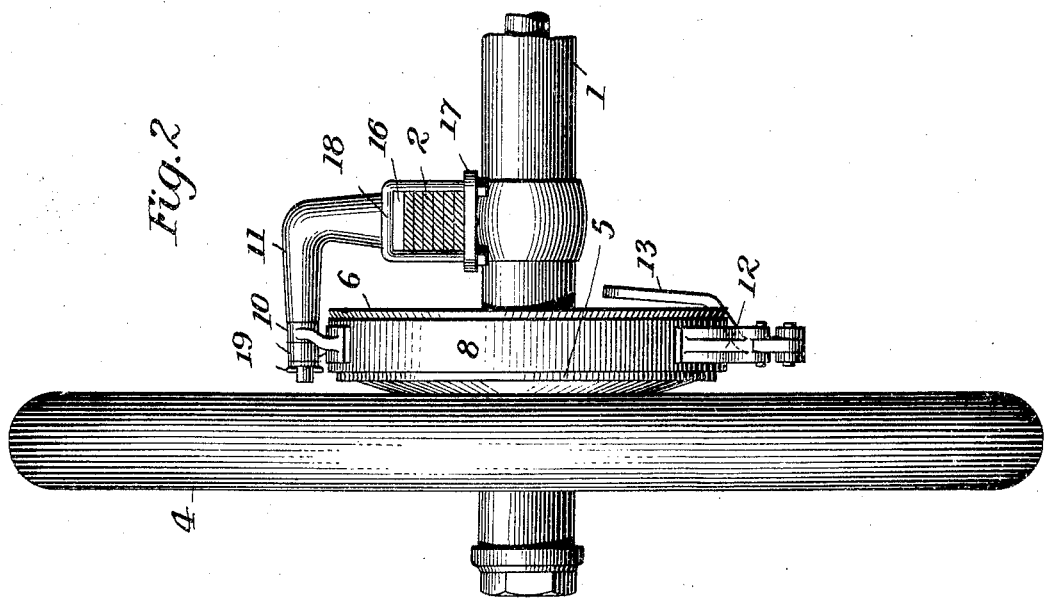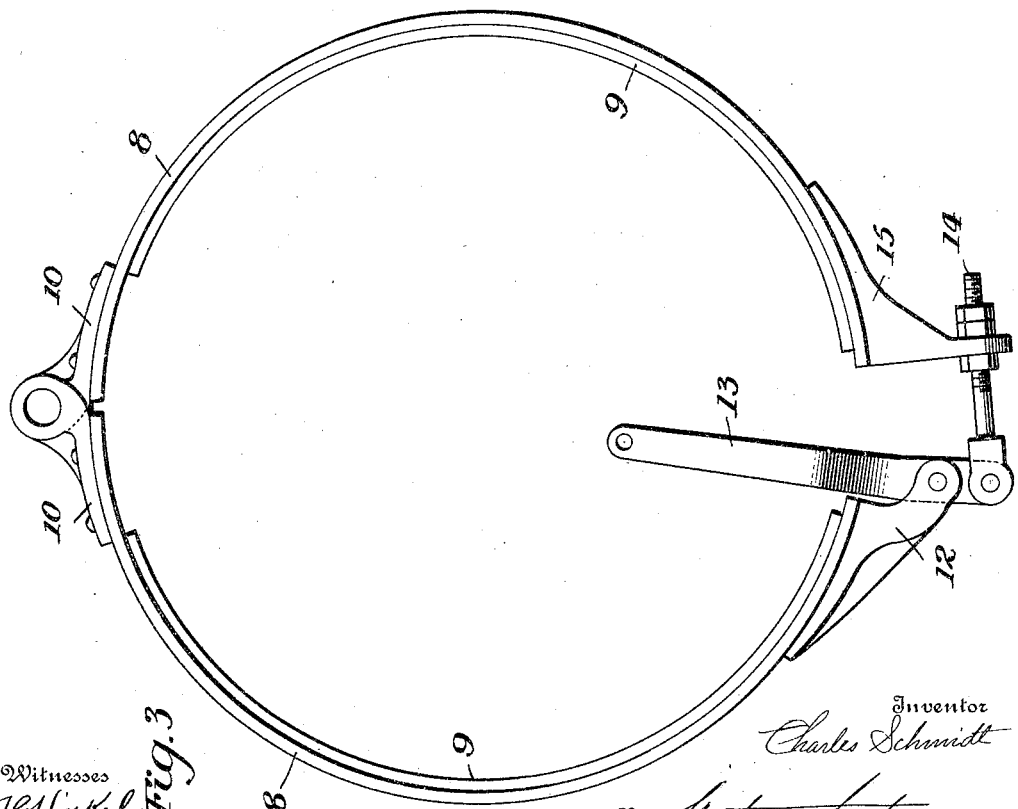

UNITED STATES PATENT OFFICE.

CHARLES SCHMIDT, OF WARREN, OHIO, ASSIGNOR TO PACKARD MOTOR CAR COMPANY, OF WARREN, OHIO, A CORPORATION OF WEST VIRGINIA.

MOTOR-VEHICLE BRAKE.

SPECIFICATION forming part of Letters Patent No. 770,392, dated September 20, 1904.

Application filed November 20, 1902. Serial No. 132,114. (No model.)

*To all whom it may concern:*

Be it known that I, CHARLES SCHMIDT, a citizen of France, residing at Warren, in the county of Trumbull, State of Ohio, have invented certain new and useful Improvements in Motor-Vehicle Brakes, of which the following is a specification.

This invention relates to motor-vehicles; and it has for its object to produce a brake which is simple, strong, and convenient in construction and reliable and powerful in operation.

The invention is illustrated in the accompanying drawings, in which—

Figure 1 is a side elevation illustrating the brake in position on a motor-vehicle. Fig. 2 is an edge view of the vehicle-wheel with brake in position, and Fig. 3 is a detail.

Referring to the drawings, 1 indicates a fixed axle of a motor-vehicle, 2 a spring supported on said axle, and 3 a part of the vehicle-frame supported on the spring. To the wheel 4 is suitably connected a brake-wheel 5, preferably of brass or bronze, having a cylindrical surface upon which the brake-shoes bear. The brake-wheel 5 is preferably provided with a flange 6 at its inner edge. As shown, the brake-wheel is connected to the vehicle-hub by bolts or rivets passing through openings 7.

The brake proper consists of two semicircular metal bands 8, preferably of steel, with semicircular shoes 9, preferably of cast-iron, riveted thereto. The bands 8 have hinge-pieces 10 attached to their upper ends, and a bracket 11 passes through said pieces and supports the brake-bands. To the lower end of one of the brake-bands is connected a bracket 12, to which the brake-lever 13 is pivoted. An adjustable link 14 connects said brake-lever with a bracket 15 on the lower end of the other brake-band. It will be seen that by moving the brake-lever 13 the brake-bands may be powerfully contracted upon the brake-wheel 5. The bracket 11 is supported rigidly upon the axle 1. For simplicity and convenience it is preferably provided with a base 16, which rests upon the spring 2, the base and spring being connected to a plate 17 on the axle by means of clips 18. The brake-bands are removably secured on the bracket 11 by cotter-pins 19, and they may be easily detached and repaired or replaced.

It will be understood that this improved brake may be applied to any or all of the wheels of a motor-vehicle. It is usually applied to the two rear wheels. The combination of the steel bands, the cast-iron shoes, and the brass or bronze brake-wheel forms a braking device which is absolutely reliable, which does not cut or stick, and which is not rendered inoperative by oil or dirt.

Having described the invention, what is claimed is—

The combination of a vehicle-axle, a brake-wheel mounted on the axle, a bracket mounted on the axle, the upper end of said bracket projecting over the brake-wheel, a brake-band comprising two members pivotally connected to said bracket and extending downwardly therefrom around the brake-wheel, an adjustable connection between said members of the brake-band below the brake-wheel, a lever fulcrumed on one of the members of said brake-band and connected at one end with the adjustable connection between said members, and means for applying power to the other end of said lever.

In testimony whereof I affix my signature in presence of two witnesses.

CHAS. SCHMIDT.

Witnesses:
 Jos. W. PACKARD,
 W. D. PACKARD.